(12) United States Patent  
Frost

(10) Patent No.: US 7,930,953 B2
(45) Date of Patent: Apr. 26, 2011

(54) GEARBOX WITH REMOVABLE OIL TANK

(75) Inventor: Cristopher Frost, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1181 days.

(21) Appl. No.: 11/606,746

(22) Filed: Nov. 30, 2006

(65) Prior Publication Data

US 2008/0127774 A1 Jun. 5, 2008

(51) Int. Cl.
*F16H 55/00* (2006.01)

(52) U.S. Cl. ............................................ 74/606 R

(58) Field of Classification Search ............ 74/606 R; 184/6.12, 65
See application file for complete search history.

(56) References Cited

U.S. PATENT DOCUMENTS

| | | | |
|---|---|---|---|
| 1,091,951 A | 3/1914 | Nelson | |
| 2,126,612 A | 8/1938 | Buckwalter et al. | |
| 4,429,587 A | 2/1984 | Finn, III et al. | |
| 4,525,995 A | 7/1985 | Clark | |
| 4,770,276 A * | 9/1988 | Takubo | ............ 184/106 |
| 5,031,477 A | 7/1991 | Rayner | |
| 5,097,926 A | 3/1992 | Duello | |
| 5,201,798 A | 4/1993 | Hogan | |
| 5,408,821 A | 4/1995 | Romero et al. | |
| 5,555,722 A | 9/1996 | Mehr-Ayin et al. | |
| 5,596,911 A | 1/1997 | Panttoila | |
| 5,634,530 A * | 6/1997 | Maekawa et al. | ............ 184/6.12 |
| 6,260,351 B1 | 7/2001 | Delano et al. | |
| 6,994,603 B2 | 2/2006 | Clark et al. | |
| 2001/0045324 A1 | 11/2001 | Harding, Jr. | |
| 2003/0015166 A1* | 1/2003 | Seymour | ............ 123/198 R |
| 2005/0274117 A1 | 12/2005 | Sheoran et al. | |

OTHER PUBLICATIONS

Search report issued on Apr. 9, 2010, for European Patent Application No. 07121830.

* cited by examiner

*Primary Examiner* — Vicky A Johnson
(74) *Attorney, Agent, or Firm* — Ingrassia Fisher & Lorenz, P.C.

(57) ABSTRACT

A gearbox for an auxiliary power unit (APU) includes a front side defining a generator interface configured to be coupled to a generator, the front side further defining an oil pump and fuel control component interface configured to be coupled to an oil pump and fuel control component, and a starter interface configured to be coupled to a starter. The gearbox further includes a back side on an opposite side to the front side and configured to house a gear train; a bottom side defining an oil tank interface configured to be coupled to an oil tank; and a debris conduit extending from the generator interface to the oil tank interface.

17 Claims, 7 Drawing Sheets

GEARBOX WITH REMOVABLE OIL TANK

FIELD OF THE INVENTION

The present invention generally relates to a gearbox for an auxiliary power unit (APU) for providing power to an aircraft. In particular, the present invention is directed to a gearbox coupled to a removable oil tank.

BACKGROUND OF THE INVENTION

Gas turbine engines have typically been employed as auxiliary power units (APUs) in aircraft to provide electrical power. In a conventional APU, the gas turbine engine has a rotatable drive shaft that is connected to a gear train housed in a gearbox for transferring force to and from the drive shaft. The gearbox can define interfaces for a number of accessories to be mounted on the gearbox. The accessories can be coupled to the gear train, and thus, to the drive shaft of the engine. These accessories can include a starter, a generator, an oil pump, and a fuel control component. Many conventional gearboxes also include an integral oil tank for supplying oil to the oil pump, accessories, gear train, and engine.

Aircraft manufacturers are continually seeking ways to reduce the weight, complexity, and costs of the APUs. The gearbox and oil tank can be a significant contributing factor to the cost and weight of the APU. Conventional gearboxes are relatively large, complex, and are integrally formed with the oil tank.

It is desirable to provide an APU having a gearbox and an oil tank with improved characteristics and performance, for example, a lighter and smaller gearbox. Other desirable features and characteristics of the present invention will become apparent from the subsequent detailed description of the invention and the appended claims, taken in conjunction with the accompanying drawings and this background of the invention.

BRIEF SUMMARY OF THE INVENTION

A gearbox for an auxiliary power unit (APU) includes a front side defining a generator interface configured to be coupled to a generator, the front side further defining an oil pump and fuel control component interface configured to be coupled to an oil pump and fuel control component, and a starter interface configured to be coupled to a starter. The gearbox further includes a back side on an opposite side to the front side and configured to house a gear train; a bottom side defining an oil tank interface configured to be coupled to an oil tank; and a debris conduit extending from the generator interface to the oil tank interface.

An apparatus comprises a gearbox for an auxiliary power unit (APU). The gearbox includes a front side defining a generator interface configured to be coupled to a generator, the front side further defining an oil pump and fuel control component interface configured to be coupled to an oil pump and fuel control component, and a starter interface configured to be coupled to a starter; a back side on an opposite side to the front side and configured to house a gear train associated with the APU; and a bottom side defining an oil tank interface configured to receive an oil tank. The apparatus further includes a debris conduit extending from the generator interface to the oil tank interface; and an oil tank coupled to the gearbox oil tank interface such that the generator is in fluid communication with the oil tank via the debris conduit.

An APU for an aircraft comprises a gas turbine engine including a rotatable drive shaft; a gearbox housing a gear train coupled to the drive shaft, the gearbox defining a starter interface, a generator interface, a oil pump and fuel control component interface, and an oil tank interface; a starter coupled to the gearbox starter interface and configured to supply a motive force to the drive shaft via the gear train; a generator coupled to the gearbox generator interface and configured to receive a motive force from the drive shaft via the gear train; an oil tank coupled to the gearbox; and a debris conduit providing fluid communication between the generator and the oil tank.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
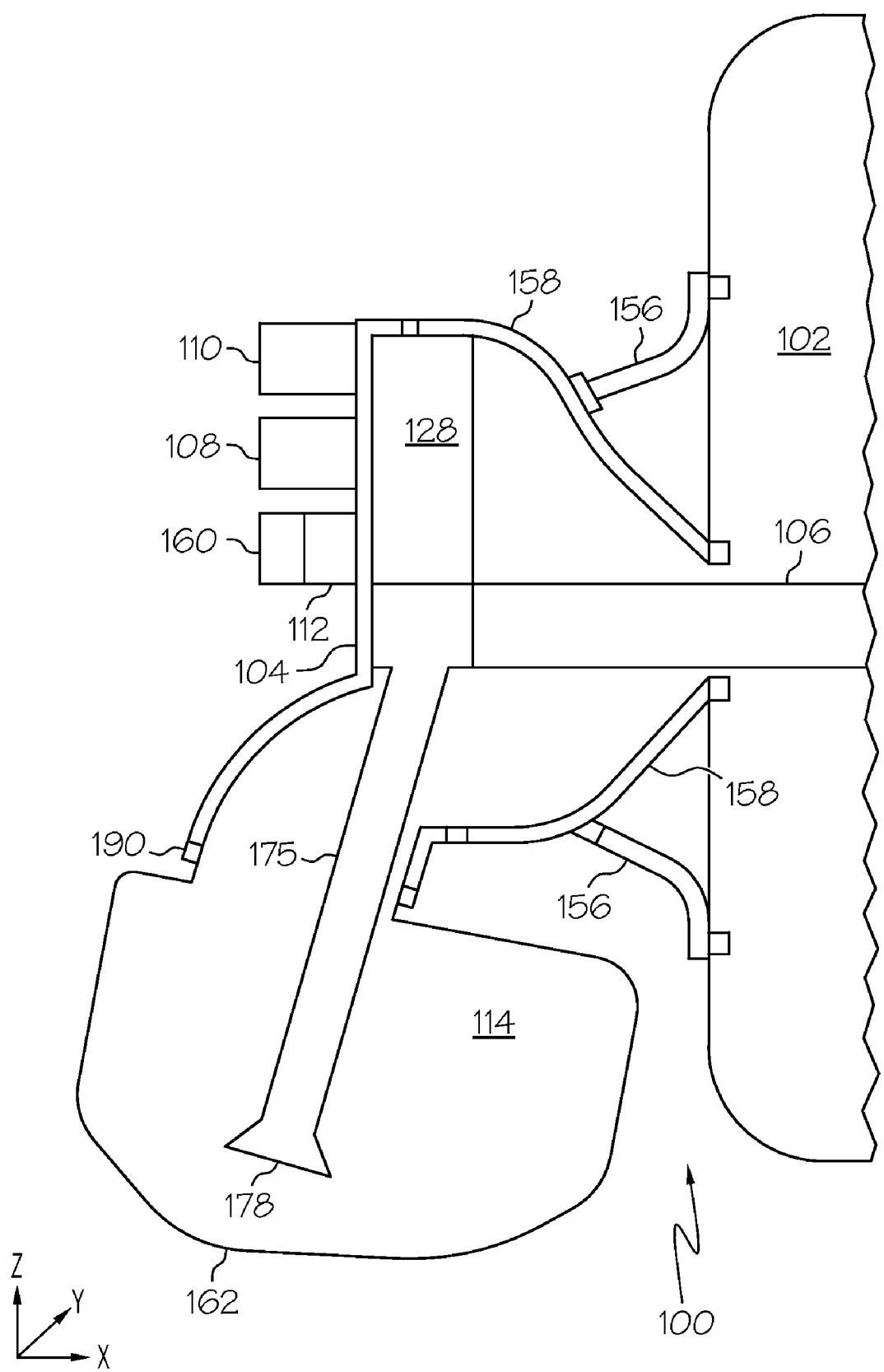
FIG. 1 is a schematic representation of an auxiliary power unit (APU) with a gearbox and oil tank in accordance with one embodiment of the present invention.

FIG. 1 is an exemplary, schematic representation of an auxiliary power unit (APU) 100. The APU 100 includes an engine 102 (partially shown) coupled to a gearbox 104. The gearbox 104 is mounted to the engine 102 by a mount ring adapter 156 and an engine thrust bearing support 158, which are discussed in further detail below. The gearbox 104 houses a gear train 128, and the engine 102 includes a rotatable drive shaft 106 coupled to the gear train 128 for transferring force to and from the drive shaft 106 to one or more accessories 108, 110, 112, 160 mounted on or within the gearbox 104. As shown in FIG. 1 and discussed in further detail below, the accessories include a generator 108, a starter 110, an oil pump 112, and a fuel control component 160. An oil tank 114 is also coupled to the gearbox 104. Further details of the gearbox 104 and the oil tank 114 will be provided with additional reference to the various views of FIGS. 2-5.

Figure 2:
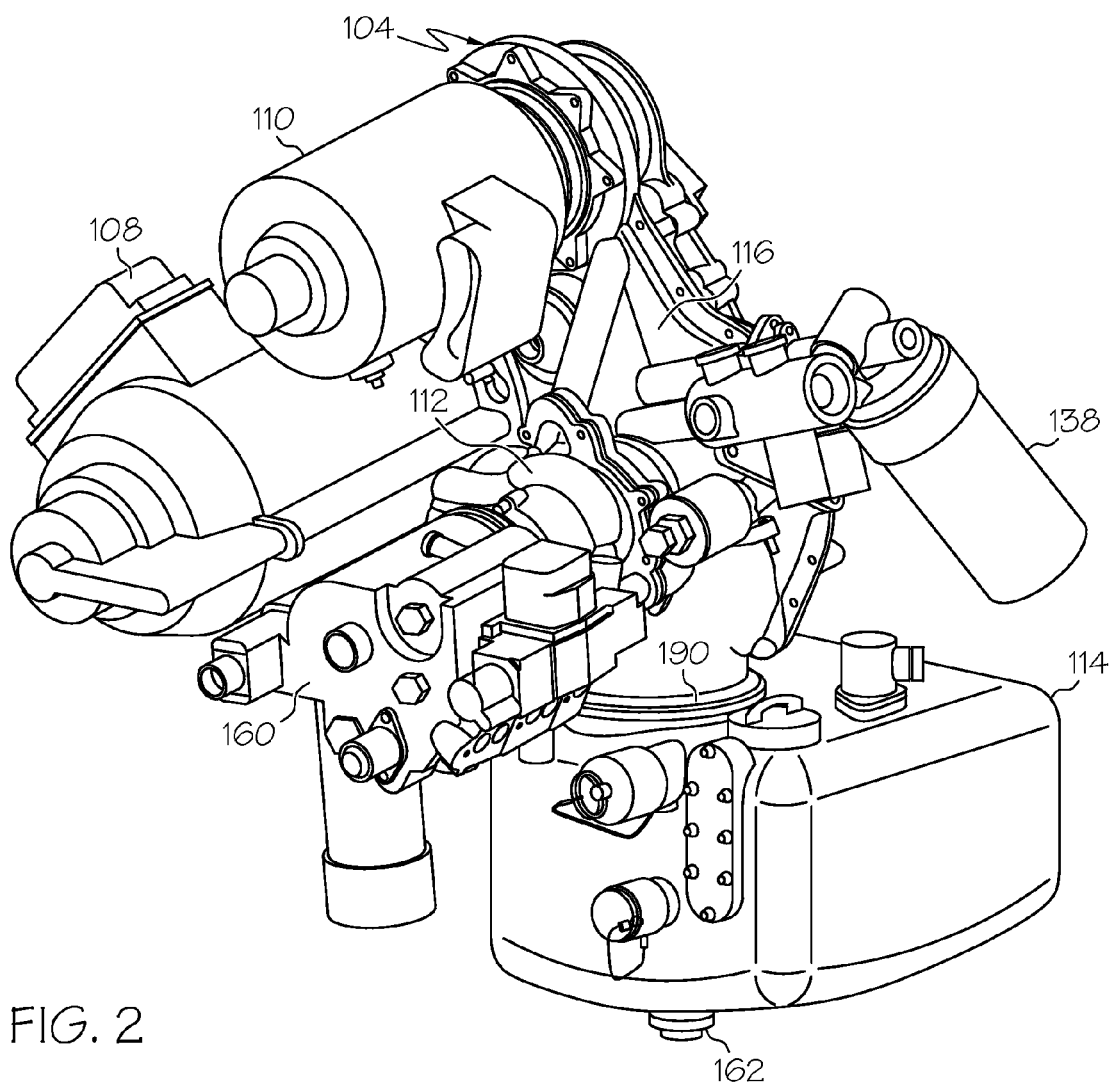
FIG. 2 is a front, more detailed view of the gearbox and oil tank of FIG. 1.
Figure 3:
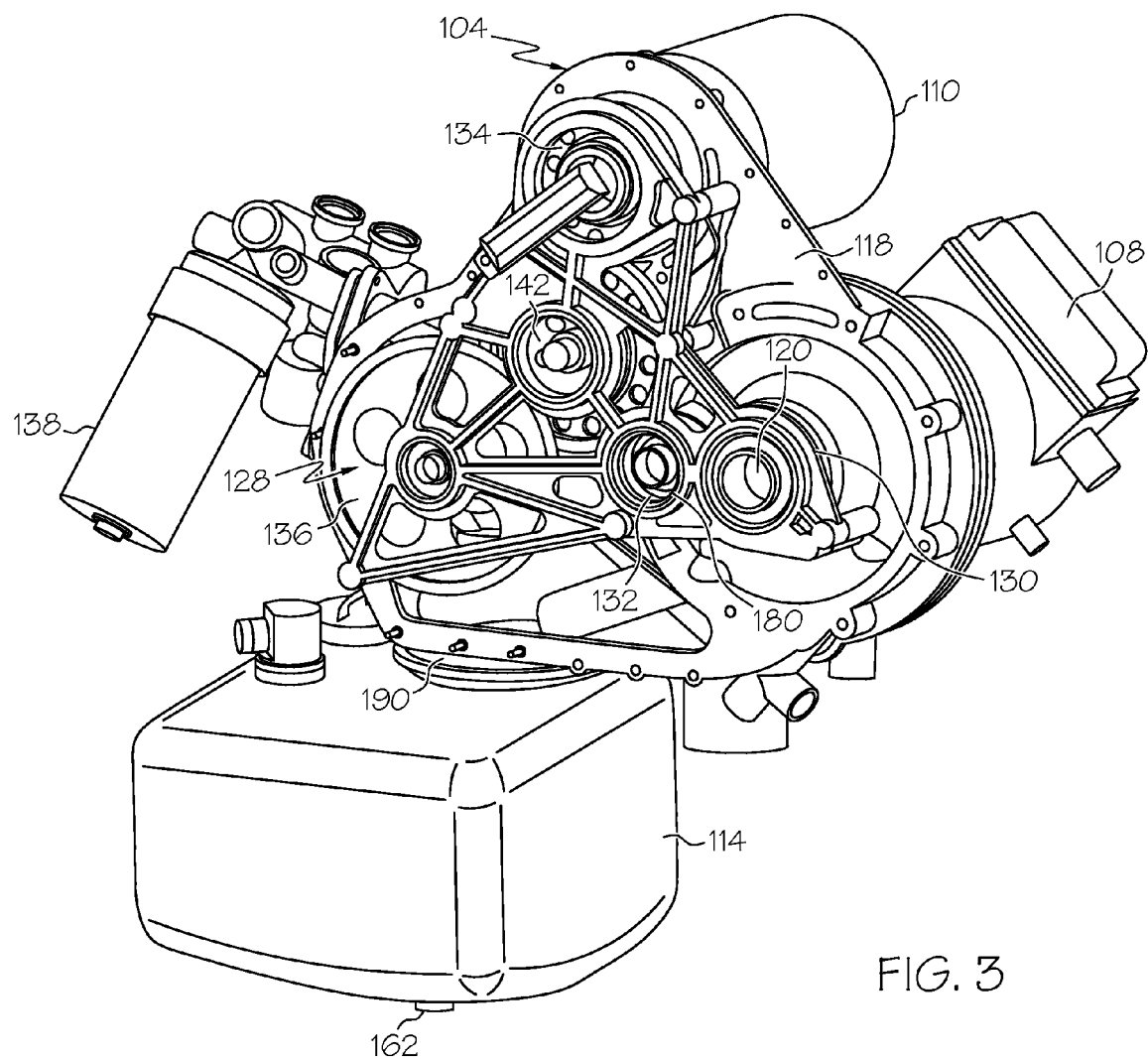
FIG. 3 is a back, more detailed view of the gearbox and oil tank of FIG. 1.

Turning now to FIGS. 2 and 3, FIG. 2 is a more detailed view of the front side 116 of the gearbox 104 and oil tank 114 of FIG. 1, and FIG. 3 is a more detailed view of the back side 118 of the gearbox 104 and oil tank 114 of FIG. 1. In FIGS. 2 and 3, the gearbox 104 is depicted removed from the APU 100 (FIG. 1) for clarity. As shown in FIG. 2, the front side 116 of the gearbox 104 defines interfaces for mounting, on the gearbox 104, the accessories such as the generator 108, the starter 110, the oil pump 112, and the fuel control component 160, and additionally, the oil tank 114.

As shown in FIG. 3, the gear train 128 is mounted on the back side 118 of the gearbox 104 and, at least in the depicted embodiment, includes a plurality of gears 130, 132, 134, 136, 142 that are configured to transmit motive forces between the engine 162 and the starter 110 and/or the generator 108. In particular, the gear train 128 includes a generator gear 130, a pinion gear 132, a starter gear 134, an oil pump and fuel control component gear 136, and a compound idler gear 142. In one embodiment, the pinion gear 132 meshes with both the generator gear 130 and the compound idler gear 142. The compound idler gear 142 additionally meshes with the starter gear 134 and the oil pump and fuel control component gear 136. The compound idler gear 142 can include an oil/air separator. One or more bearings (not shown) can additionally support the gear train 128.

Figure 4:
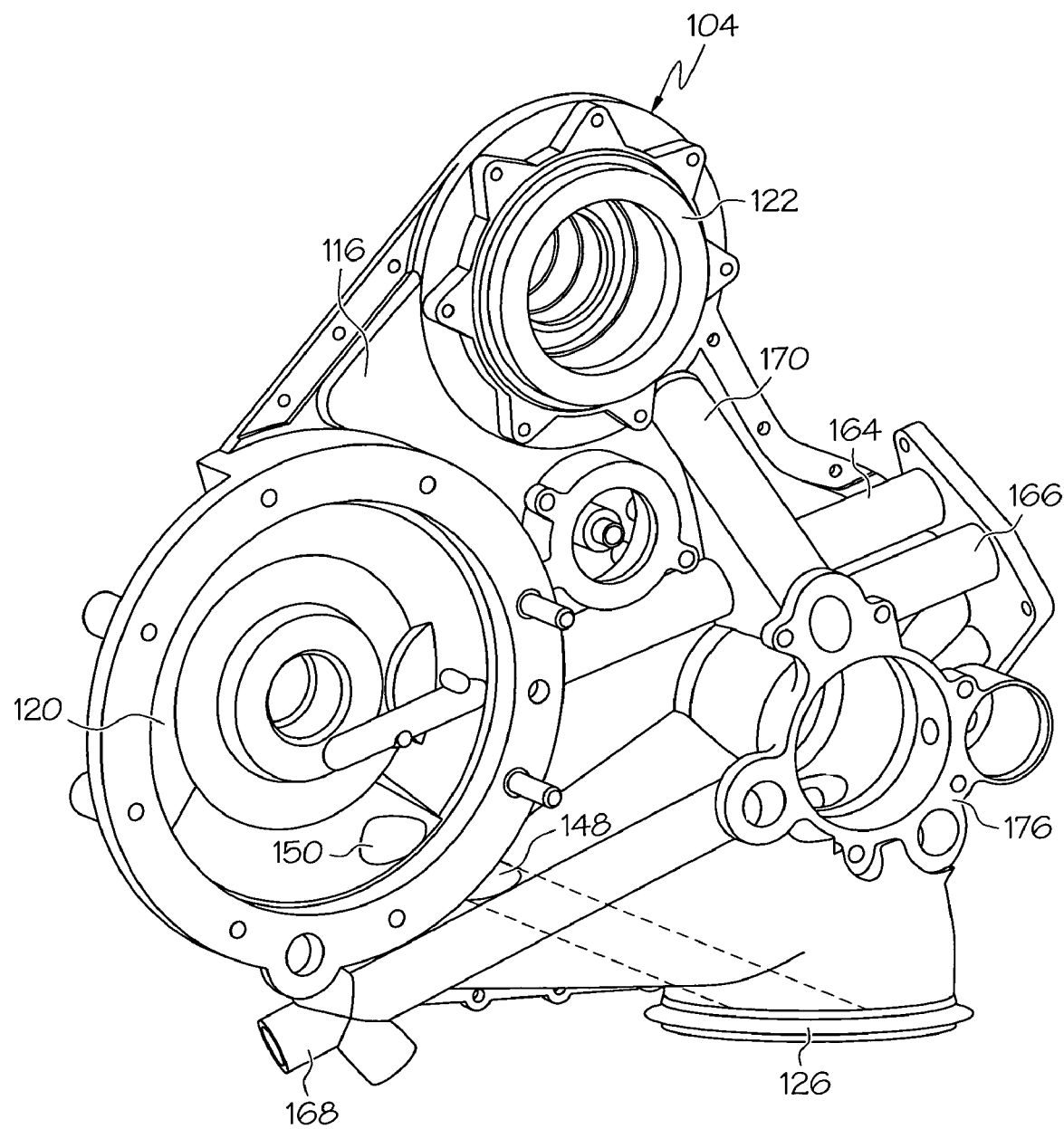
FIG. 4 is another front, more detailed view of the gearbox of FIG. 1.

Referring additionally to FIG. 4, which shows the front side 116 of the gearbox 104 with the accessories 108, 110, 160, 112 and the oil tank 114 removed for clarity, the generator 108 is coupled to the gearbox 104 at a generator interface 120 on the front side 116 of the gearbox 104. The generator 108 engages with the generator gear 130 and receives motive force from the engine drive shaft 106 (FIG. 1) via the pinion gear 132. In turn, the generator 108 generates and supplies electrical power to the aircraft.

The starter 110 is coupled to the front side 116 of the gearbox 104 at a starter interface 122, and engages the starter gear 134. The starter 110 drives the pinion gear 132, and thus, the drive shaft 106 of the engine 102, through the starter gear 134 and compound idler gear 142.

Briefly, during operation, the starter 110 initially drives the draft shaft 106 via the gear train 128 to cause rotation of the compressors and turbine of the engine 102 until fuel ignition begins within the combustor. After ignition, the drive shaft 106 drives the generator 108, and the generator 108 converts the motive force of the drive shaft 106 into current for use in aircraft operations.

The oil pump 112 and fuel control component 160 are coupled to the gearbox front face 116 at the oil pump and fuel control component interface 176. Particularly, the fuel control component 160 is coupled to the oil pump 112, and the oil pump 112 is coupled to the gearbox 104. The oil pump 112 and fuel control component 160 are in communication with the oil pump and fuel control gear 136. The oil pump 112 supplies oil to component in the gearbox 104 and engine 102, as discussed in further detail below. The fuel control component 160 supplies fuel to the engine 102.

The oil tank 114 is coupled to the bottom of the gearbox 104 at an oil tank interface 126, and defines a volume in which a supply of lubricant, such as oil is stored. The oil tank 114 is in communication with the oil pump 112 via an oil suction tube 175 (FIG. 1) to supply oil to the gear train 128, other components in the gearbox 104, and the engine 102. The oil tank 114 is gravity-fed and can be removed at the oil tank interface 126 as necessary. The oil tank 114 can be mounted to the oil tank interface 126 with a clamp 190, for example, a v-band clamp.

As best shown in FIG. 4, the gearbox 104 defines a number of oil passages, such as oil passages 164, 166, 168, 170, for distributing oil from the oil tank 114, via the oil pump 112, to the gear train 128. In the depicted embodiment, the oil passages 164, 166, 168, 170 are generally straight, although the passages could be alternately configured. The oil passages 164, 166, 168, 170 can be machined or cast into the gearbox 104, or formed separately and coupled to the gearbox 104. Since the passages 164, 166, 168, 170 are preferably straight, the passages 164, 166, 168, 170 can be easily cleaned with, for example, a bottle brush. As particularly shown in FIGS. 2 and 3, an oil sensor module 138 can be mounted to the gearbox 104 for managing the flow of oil through the oil pump 112 and oil cooler (not shown). Once the oil is distributed to the gear train 128 and the engine 102, the oil collects again in the oil tank 114. By way of example, oil passage 168 scavenges generator oil and transfers it to the oil pump 112, oil passage 166 provides oil to the oil cooler (not shown) via the oil sensor module 138, oil passage 164 provides oil to the gear train 128 and the engine 102, and oil passage 170 provides oil to the starter 110 (FIG. 1).

Figure 5:
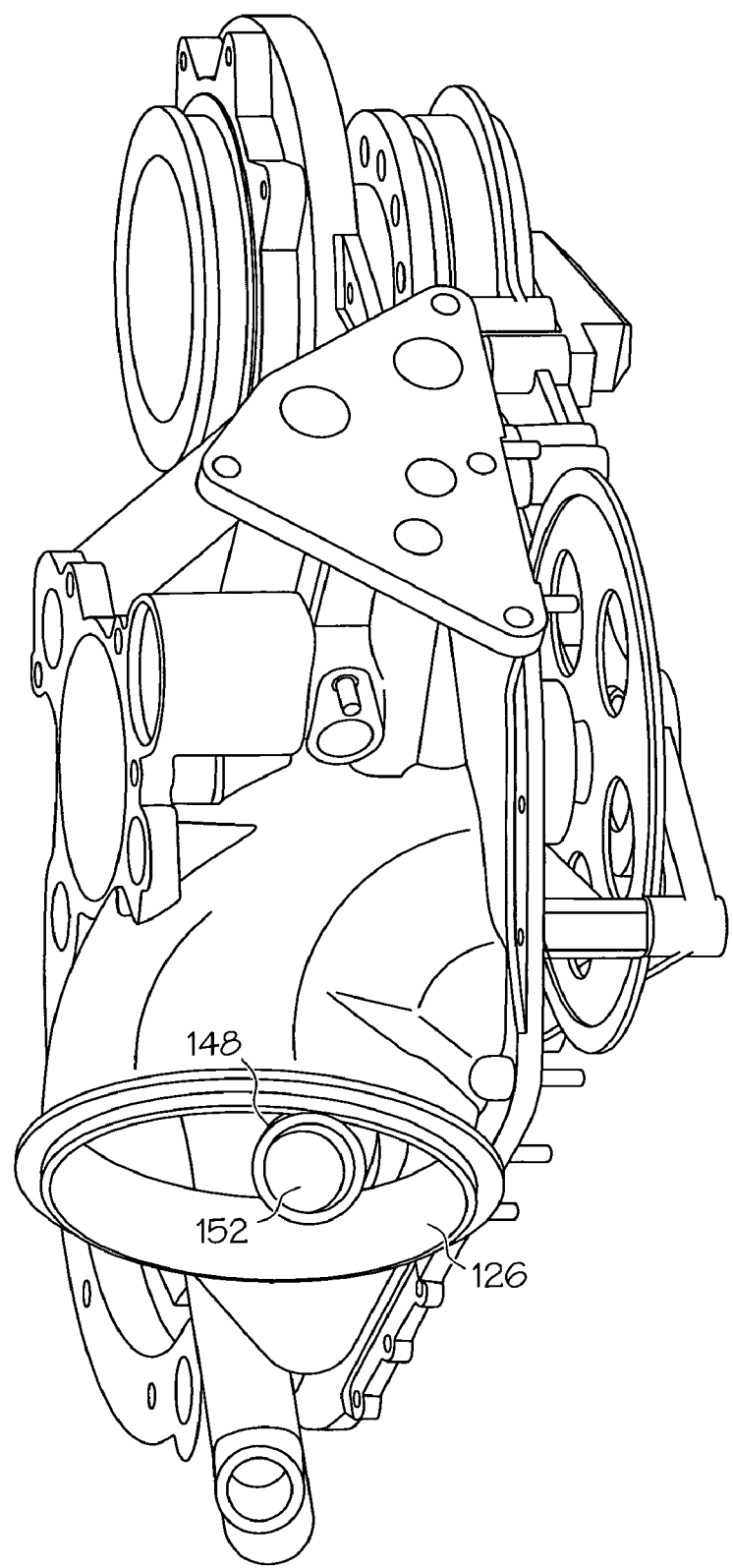
FIG. 5 is a bottom, more detailed view of the gearbox of FIG. 1.

Referring additionally to FIG. 5, which shows a bottom side view of the gearbox 104, the gearbox 104 defines a debris conduit 148 that extends from the generator interface 120 to the oil tank interface 126. A first end 150 of the debris conduit 148 opens at the generator interface 120, as shown in FIG. 4. The debris conduit 148 extends through the gearbox 104, as indicated by the dashed lines in FIG. 4, and extends to a second end 152 opening at the oil tank interface 126, as shown in FIG. 5. In an alternate embodiment, the debris conduit 148 is a external pipe or hose that extends from the generator interface 120 to the oil tank 114. In one embodiment, the debris conduit 148 is about 1 inch in diameter and about 8 inches long.

Debris from a failed, worn, or damaged generator 108 can be particularly damaging to the gear train 128 and other components in the gearbox 104 and engine 102. In the gearbox 104 of the present invention, any debris from the generator 108 can be directed, via the debris conduit 148, to the oil tank 114 and not damage the gear train 128. The oil tank 114 can include a filter 178 within the oil suction tube 175 (FIG. 1) to filter out the debris from the generator 108.

Exemplary embodiments of the gearbox 104 are advantageous in that the oil tank 114 is in a relatively "quiet zone" such that a portion of the oil tank 114 extends into a plane forward of the gear train 128. Many conventional gearboxes have an oil tank directly below the gears and can consist of mere oil sumps where oil collects at the low point of the gearbox directly below the gears. This can result in the oil in the oil tank being churned up, for example due to attitude changes, and heated by the rotating gear train. As can be seen most clearly in FIG. 5, the oil tank interface 126 is coupled to the gearbox 104 in a plane forward of the gear train 128. The oil tank 114 is generally conically shaped, and a low point 162 of oil collection is approximately in the center of the oil tank 114. Generally, the oil tank 114 is wider (in an x-direction of FIG. 1) and less deep (in a y-direction of FIG. 1) than many conventional oil tanks. In one embodiment, the gearbox 104 has dimensions of about 12"×12"×10" in the x, y, and z directions of FIG. 1. Conventional oil tanks are generally less wide (e.g., in an x-direction of FIG. 1) and longer (e.g., in a z-direction of FIG. 1). The oil tank 114 is also slightly angled, for example, about 8°, in the FIGS and on the APU 100 when the aircraft is on the ground. Since the APU 100 has a corresponding slant of about 8° during level flight, the oil tank 114 is approximately upright during flight.

In conventional arrangements, the APU is mounted to the aircraft via the gearbox with integral mounting features such that the gearbox cannot be removed from the engine without removing the entire APU from the aircraft. In one embodiment of the present invention, the gearbox 104 is mounted on the engine 102, which is then mounted to the aircraft. As such, the gearbox 104, oil tank 114, and gear train 128 can each be removed from the APU 100 while the APU 100 is mounted on the aircraft.

The gearbox 104 is much lighter than conventional gearboxes and reduces unnecessary space. The gearbox 104 can be manufactured as an integral unit to reduce weight and simplify construction. The gearbox 104 can define all of the passages and structure necessary to support the gear train 128. Moreover, as particularly shown in FIG. 3, an exemplary embodiment of the gearbox 104 has a footprint with an area that approximates an area defined by the gear train 128. In other words, the gearbox 104 is generally shaped to the gears and reduces or eliminates unnecessary space.

Figure 6:
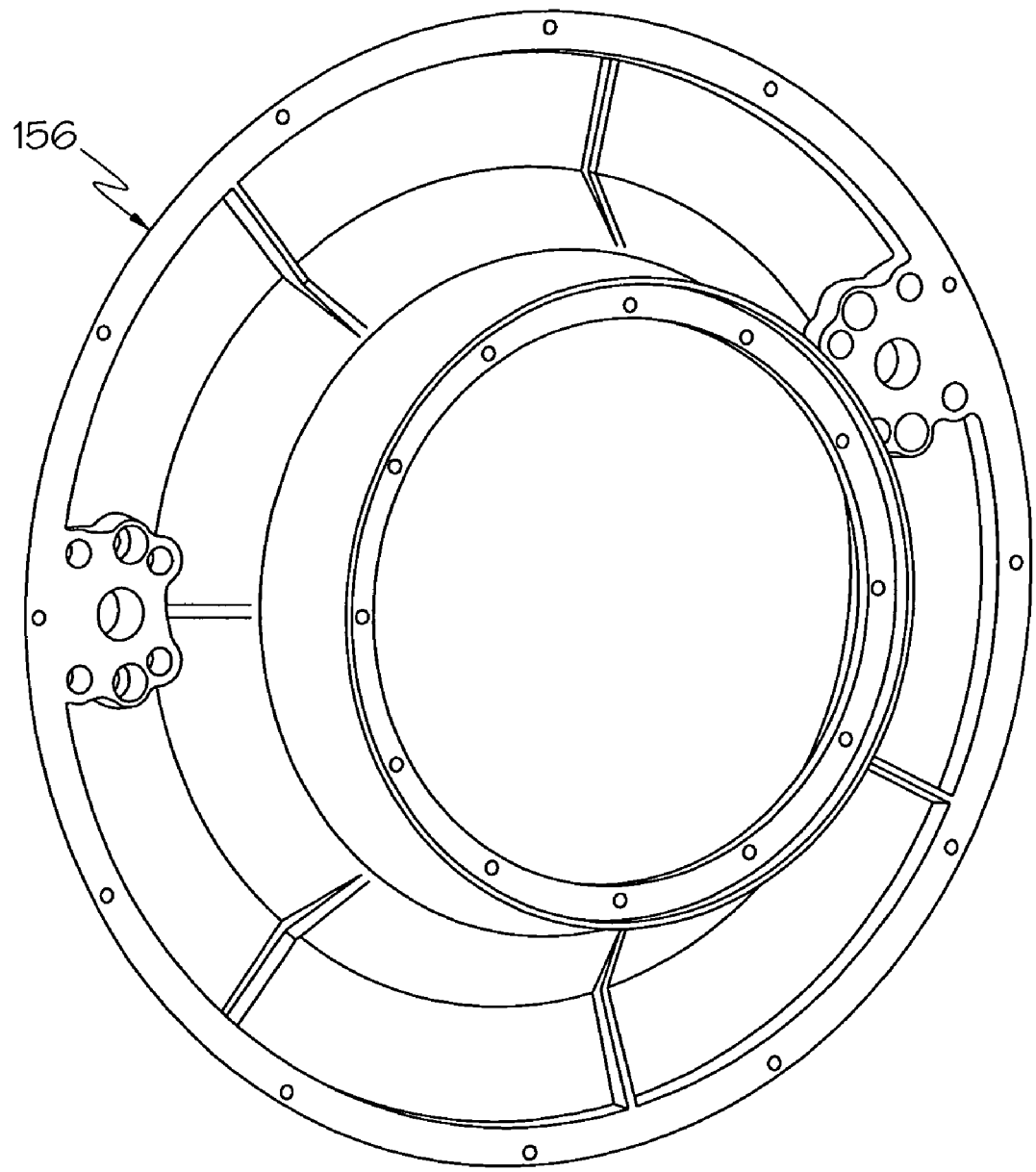
FIG. 6 is a view of a mount ring adapter for mounting the APU of FIG. 1.
Figure 7:
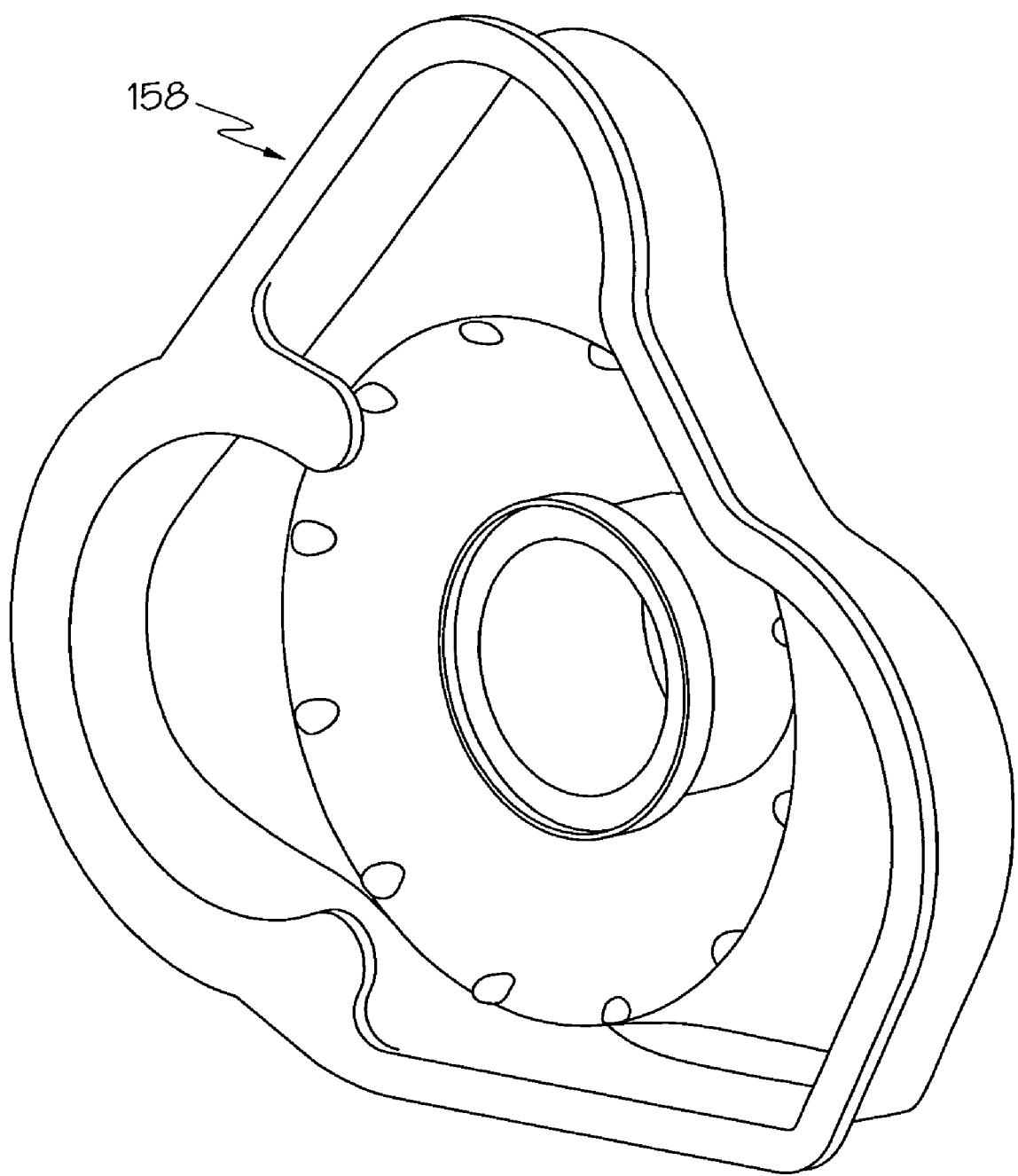
FIG. 7 is a view of an engine thrust bearing support for mounting the gearbox of FIG. 1.

Referring particularly again to FIG. 1 and additionally to FIGS. 6 and 7, the mounting of the gearbox will now be described. The gearbox 104 can be simpler to install as compared to conventional gearboxes. Many conventional gearboxes have a large round shape to enable proper piloting, alignment, and mounting support. In one embodiment, the gearbox 104 is mounted on the engine 102 by the engine thrust bearing support 158. FIG. 1 schematically illustrates the gearbox 104 mounted to the engine thrust bearing support 158, which is then mounted to the engine 102 via the APU mount ring adapter 156. FIGS. 6 and 7 respectively illustrate the mount ring adapter 156 and the engine thrust bearing support 158 separated from the gearbox 104 and the engine 102. The engine thrust bearing support 158 has one side with a circumference that surrounds one end of the drive shaft 106 and another side that attaches to the back side 118 of the gearbox 104. The mount ring adapter 156 has a generally frustoconical shape with a hollow center for receiving the engine thrust bearing support 158.

The engine thrust bearing support 158 additionally provides a piloting feature for the gearbox 104 that interfaces with a bearing bore of the pinion gear 132 located in a gear aft bearing carrier 180 (FIG. 3). Conventional gearboxes typically require the large, circular shape of a bolt flange to enable proper piloting. The shape of the gearbox 104 enables much easier piloting approximately adjacent the drive shaft 106. Moreover, the gearbox 104 also has a relatively small contact area with respect to the engine 102, primarily due to the configuration of the mount ring adapter 156 and engine thrust bearing support 158. In conventional gearboxes, the entire length of the gearbox, including the integral oil tank (e.g., in the y and z-direction of FIG. 1) is essentially directly coupled to the engine and results in heat being transferred to the oil in the gearbox and oil tank.

Since the gearbox 104 and the oil tank 114 are separate components, the gearbox 104 and the oil tank 114 can be manufactured from separate materials. This is advantageous in that the oil tank 114 can be subject to more stringent fire resistance requirements than the gearbox 104 and require the use of a relatively fire resistant, and therefore heavier, material. Even if the oil tank 114 is subject to these requirements, the gearbox 104 can be manufactured from a lighter and/or less fire resistant material than the oil tank 114. In one embodiment, the oil tank 114 is manufactured from steel and the gearbox 104 is manufactured from aluminum. In another embodiment, both the oil tank 114 and the gearbox 104 are manufactured from aluminum.

In one embodiment, the gearbox 104 weighs approximately 9.6 pounds, the oil tank 114 weighs approximately 3.8 pounds, the engine thrust bearing support 158 weighs 5.8 pounds, and the mount ring adapter 156 weighs 10 pounds for a total of approximately 29.2 pounds. An analogous, conventional gearbox, oil tank, and mounting components weigh about 42.5 pounds.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An apparatus comprising:
    a gearbox for an auxiliary power unit (APU) comprising:
        a front side defining a generator interface configured to be coupled to a generator, the front side further defining an oil pump and fuel control component interface configured to be coupled to an oil pump and fuel control component, and a starter interface configured to be coupled to a starter,
        a back side on an opposite side to the front side and configured to house a gear train associated with the APU, and
        a bottom side defining an oil tank interface;
    a debris conduit extending from the generator interface to the oil tank interface;
    an oil tank coupled to the gearbox oil tank interface such that the generator is in fluid communication with the oil tank via the debris conduit; and
    a clamp configured to releasable couple the oil tank to the gearbox at the oil tank interface.

2. The apparatus of claim 1, wherein the gearbox is configured to house the gear train approximately in a first plane and the oil tank interface has a central axis that is offset relative to the first plane.

3. The apparatus of claim 1, wherein the oil tank is manufactured from a first material and the gearbox is manufactured from a second material, the first material being heavier than the second material.

4. The apparatus of claim 3, wherein the first material is steel and the second material is aluminum.

5. The apparatus of claim 1, wherein the debris conduit is integral with the gearbox.

6. The apparatus of claim 1, wherein the gearbox defines a plurality of straight oil conduits for supplying oil to the gear train.

7. The apparatus of claim 1, wherein the oil tank is conical.

8. The apparatus of claim 1, wherein the oil tank is detachable from the gearbox and gravity fed.

9. The apparatus of claim 1, wherein the gear train is generally arranged in a first plane, and wherein the oil tank interface is a generally circular opening and the central axis of the circular opening is non-parallel to the first plane.

10. The apparatus of claim 9, wherein the central axis is offset about 8° relative to the first plane.

11. The apparatus of claim 1, wherein the back side of the gearbox is configured to be coupled to an engine compartment of the APU, the oil tank being separated from the engine compartment in a mounted state.

12. The apparatus of claim 11, wherein the oil tank projects in a direction away from the engine compartment.

13. The apparatus of claim 1, wherein the front side and the back side of the gearbox are integral with one another.

14. The apparatus of claim 1, wherein the oil tank mates only with the gearbox in a mounted state.

15. An apparatus comprising:
    a gearbox for an auxiliary power unit (APU) comprising:
        a front side defining a generator interface configured to be coupled to a generator, the front side further defining an oil pump and fuel control component interface configured to be coupled to an oil pump and fuel control component, and a starter interface configured to be coupled to a starter, a back side on an opposite side to the front side and configured to house a gear train associated with the APU, and a bottom side defining an oil tank interface;

a debris conduit extending from the generator interface to the oil tank interface; and an oil tank coupled to the gearbox oil tank interface such that the generator is in fluid communication with the oil tank via the debris conduit, wherein the gearbox defines a plurality of straight oil conduits for supplying oil to the gear train, wherein the plurality of straight conduits includes a first conduit defined within the gearbox and extending in a straight line directly from the starter interface to the oil pump and fuel control interface.

16. The apparatus of claim 1, wherein the debris conduit is machined directly into the gearbox.

17. An apparatus comprising:

a gearbox for an auxiliary power unit (APU) comprising:

a front side defining a generator interface configured to be coupled to a generator, the front side further defining an oil pump and fuel control component interface configured to be coupled to an oil pump and fuel control component, and a starter interface configured to be coupled to a starter, a back side on an opposite side to the front side and configured to house a gear train associated with the APU, and a bottom side defining an oil tank interface;

a debris conduit extending from the generator interface to the oil tank interface; and an oil tank coupled to the gearbox oil tank interface such that the generator is in fluid communication with the oil tank via the debris conduit, wherein the debris conduit extends in a straight line directly from the generator interface to the oil tank interface.

* * * * *

UNITED STATES PATENT AND TRADEMARK OFFICE
CERTIFICATE OF CORRECTION

| | | |
|---|---|---|
| PATENT NO. | : 7,930,953 B2 | Page 1 of 1 |
| APPLICATION NO. | : 11/606746 | |
| DATED | : April 26, 2011 | |
| INVENTOR(S) | : Frost | |

It is certified that error appears in the above-identified patent and that said Letters Patent is hereby corrected as shown below:

Column 6, line 27, "releasable" should be changed to --releasably--.

Signed and Sealed this
Twenty-third Day of August, 2011

David J. Kappos
*Director of the United States Patent and Trademark Office*